No. 895,152. PATENTED AUG. 4, 1908.
A. BORNEFELD.
CLUTCH.
APPLICATION FILED APR. 13, 1908.
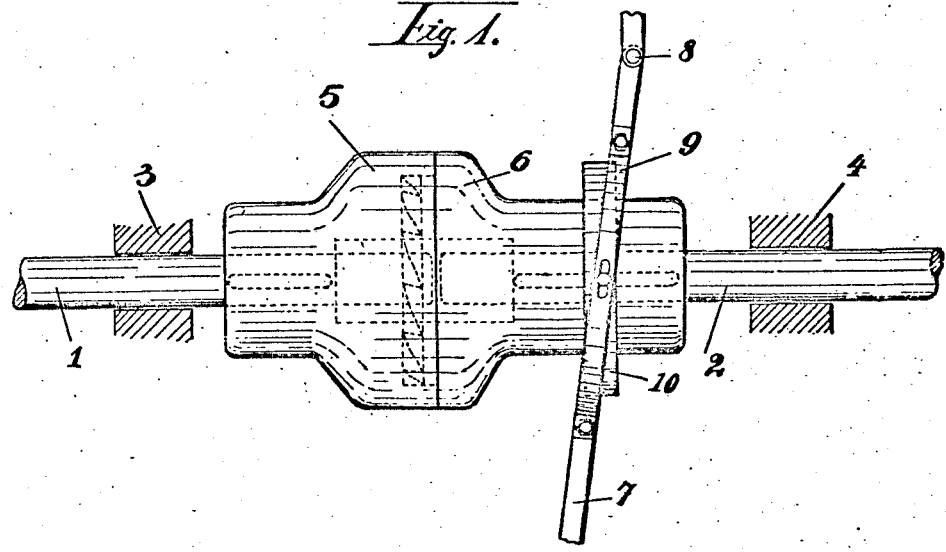
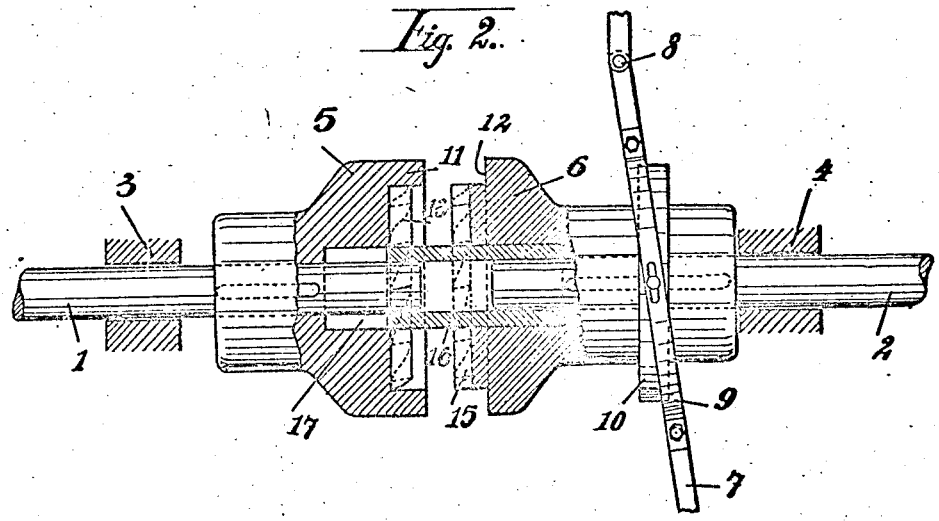

UNITED STATES PATENT OFFICE.

ALBERT BORNEFELD, OF BARMEN, GERMANY.

CLUTCH.

No. 895,152.　　　Specification of Letters Patent.　　Patented Aug. 4, 1908.

Application filed April 13, 1908. Serial No. 426,772.

*To all whom it may concern:*

Be it known that I, ALBERT BORNEFELD, a subject of the German Emperor, and resident of Barmen, Germany, have invented 5 certain new and useful Improvements in Clutches, of which the following is a specification.

This invention relates to an improved clutch in which, upon its being put in or out 10 of gear, one of the two shafts to be coupled is shifted in axial direction in its bearings together with the coupling member fixed to it. At the same time a shell which is mounted in this coupling member and fixed on the shaft 15 of the latter engages also upon the clutch being put out of gear the end of the other shaft to be coupled, for the purpose of insuring an easy and practically noiseless working of the clutch, and fits upon the 20 clutch being put in gear a corresponding cavity of the coupling member of said other shaft.

The improved coupling is represented on the accompanying drawing in which

25　Figure 1 is an elevation of the same as put in gear; and Fig. 2 a sectional elevation of the same as put out of gear.

The shafts 1 and 2 rest in bearings 3 and 4 and carry on their adjacent ends the coupling 30 members 5 and 6. The shaft 2 is capable of being shifted in axial direction which can be effected by the operating lever 7 which is fulcrumed on the pivot 8 and shaped so as to inclose, and engage, with its ring 9 the collar 35 10 of the coupling member 6 of shaft 2.

A narrow ring edge 11 of the coupling member 5 of the other shaft 1 fits upon the clutch being put in gear a corresponding groove 12 of the coupling member 6. Within the ring edge 11 and groove 12 respectively, the inner 40 faces of the coupling members engage each other by means of a known gripping arrangement, 13 and 15.

In the coupling member 6 a shell 16 is mounted and fixed on the shaft 2, the bore of 45 this shell corresponding to the diameter of the shaft 1 so as to engage also upon the clutch being put out of gear the end of said shaft 1 and to fit upon the clutch being put in gear a cavity 17 of the coupling member 5 50 of said shaft 1, this having the object to insure, in spite of the vibration of the shaft ends, an easy and practically noiseless engagement of the clutch.

Having fully described my invention, what 55 I claim and desire to secure by Letters Patent is:—

A clutch comprising shafts to be coupled one of said shafts being capable of being shifted in axial direction, and the coupling 60 members fixed on said shafts one of said coupling members being in its inner face provided with a cavity; a shell fixed on said movable shaft and mounted in the coupling member of the latter and designed to engage 65 upon the clutch being put out of gear the end of said other shaft and upon the clutch being put in gear to fit the cavity in the coupling member of said other shaft, for the purpose set forth.　　　　　　　　　　　　　　70

In testimony whereof I have hereunto set my hand in the presence of two subscribing witnesses.

ALBERT BORNEFELD. [L. S.]

Witnesses:
　WM. WASHINGTON BRUNSINET,
　OTTO KÖNIG.